(12) United States Patent
Blackman et al.

(10) Patent No.: US 7,962,151 B2
(45) Date of Patent: Jun. 14, 2011

(54) SYSTEM AND METHOD FOR OBTAINING LOCATION OF WIRELESS TELEPHONE FROM INTERNET SERVER

(75) Inventors: David John Blackman, Cary, NC (US); Jennifer Lee-Baron, Morrisville, NC (US); David Wayne Wall, Cary, NC (US); Peter Hamilton Wetsel, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 890 days.

(21) Appl. No.: 11/714,501

(22) Filed: Mar. 6, 2007

(65) Prior Publication Data
US 2008/0220811 A1    Sep. 11, 2008

(51) Int. Cl.
*H04W 24/00* (2009.01)

(52) U.S. Cl. ............... 455/456.1; 455/404.2; 455/456.2; 455/456.5; 701/207

(58) Field of Classification Search ............... 455/550.1, 455/404.2, 407, 414.1, 456.1–457, 450.1; 701/207–213; 340/989–994, 426.19–426.22, 340/539.19, 825.49
See application file for complete search history.

(56) References Cited

U.S. PATENT DOCUMENTS

| | | | |
|---|---|---|---|
| 6,850,602 B1 * | 2/2005 | Chou | 379/80 |
| 7,421,278 B2 * | 9/2008 | Srinivasan et al. | 455/456.3 |
| 7,623,526 B2 * | 11/2009 | Rangel et al. | 370/395.5 |
| 2002/0131402 A1 * | 9/2002 | Lee et al. | 370/352 |
| 2004/0132472 A1 * | 7/2004 | Murakami | 455/514 |
| 2005/0037762 A1 * | 2/2005 | Gurbani et al. | 455/445 |
| 2005/0059380 A1 * | 3/2005 | Tomita | 455/411 |
| 2005/0227709 A1 * | 10/2005 | Chang et al. | 455/456.1 |
| 2005/0261006 A1 * | 11/2005 | Hirsbrunner et al. | 455/457 |
| 2007/0072620 A1 * | 3/2007 | Levitan | 455/456.1 |
| 2008/0132199 A1 * | 6/2008 | Hirata | 455/404.2 |

OTHER PUBLICATIONS

"Make Free Calls with the Belkin Wi-Fi® Phone for Skype™", Belkin International, 2006. http://www.belkin.com/pressroom/releases/uploads/07_20_06WiFiSkypePhone.html.*

* cited by examiner

*Primary Examiner* — Charles N Appiah
*Assistant Examiner* — Marisol Fahnert
(74) *Attorney, Agent, or Firm* — John L. Rogitz

(57) ABSTRACT

A user who loses or has stolen his wireless telephone can access an Internet server that prompts the phone to send to the server (and, hence, the user) the GPS location of the phone. Also, when a wireless telephone reaches a low voltage state, indicating the imminent loss of the ability to call the phone to cause it to ring as a location aid, the phone automatically sends its last GPS location to the server.

3 Claims, 3 Drawing Sheets

SYSTEM AND METHOD FOR OBTAINING LOCATION OF WIRELESS TELEPHONE FROM INTERNET SERVER

FIELD OF THE INVENTION

The present invention relates generally to systems and methods for obtaining the location of a wireless telephone using an Internet server.

BACKGROUND OF THE INVENTION

Wireless telephones are becoming increasingly prevalent in today's society. They often contain important data such as personal schedules and phone numbers of friends and family. Reliance on the data stored in wireless telephones has become significant, yet few users ever backup their data to a secondary location. Misplaced or stolen wireless telephones can result in loss of important and sometimes irretrievable data. Moreover, if the wireless telephone is stolen by a malicious thief, data accessible to the theft on the wireless telephone such as telephone numbers of friends and family may compromise individual security.

As understood herein, if a wireless telephone is stolen from a user, initiating the ring function to locate the wireless telephone based on the source of the sound is ineffective in locating the phone because it will be outside the audible range of the user. Indeed, once the theft occurs, it is nearly impossible to discover the wireless phones location. There is currently no method for finding the wireless telephone once it has been stolen.

Moreover, telephones can be misplaced and are difficult to locate and, once the voltage in the battery dwindles, not enough remains to operate the wireless telephone. At this point the user cannot call the telephone to trigger the ring function and thereby allow the attentive user to locate the wireless telephone based on the source of the sound generated by the wireless phone. Thus, once the wireless telephones battery lacks the necessary voltage to remain operational, thereby preventing activation of the ring function, the wireless telephone cannot be located by causing it to ring. There is currently no solution to this issue either.

With these critical observations in mind, the present invention is provided.

SUMMARY OF THE INVENTION

A method is disclosed for locating a wireless telephone that includes a transceiver and a position receiver. The method includes actuating an Internet server to establish communication with the wireless telephone. The server prompts the telephone to use the transceiver to send a location from the position receiver to the server. The location is provided to a user by means of a website hosted by the server.

The transceiver can be a wireless telephony transceiver, and the server can communicate with the wireless telephone using a telephone number of the telephone. Also, a short range wireless Internet transceiver can be provided in the phone, and the server can communicate with the wireless telephone using an IP address of the telephone.

In another aspect, a wireless telephone has a wireless telephony transceiver, a position receiver outputting a geographic position signal, and a processor. The processor responds to a command from an Internet server to send the geographic position signal to the server.

In yet another aspect, a wireless telephone has a wireless telephony transceiver, a position receiver outputting a geographic position signal, a battery, and a processor. The processor automatically activates the transceiver to send the geographic position signal when a voltage of the battery satisfies at least one criterion, e.g., when the battery voltage reaches a low voltage threshold.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
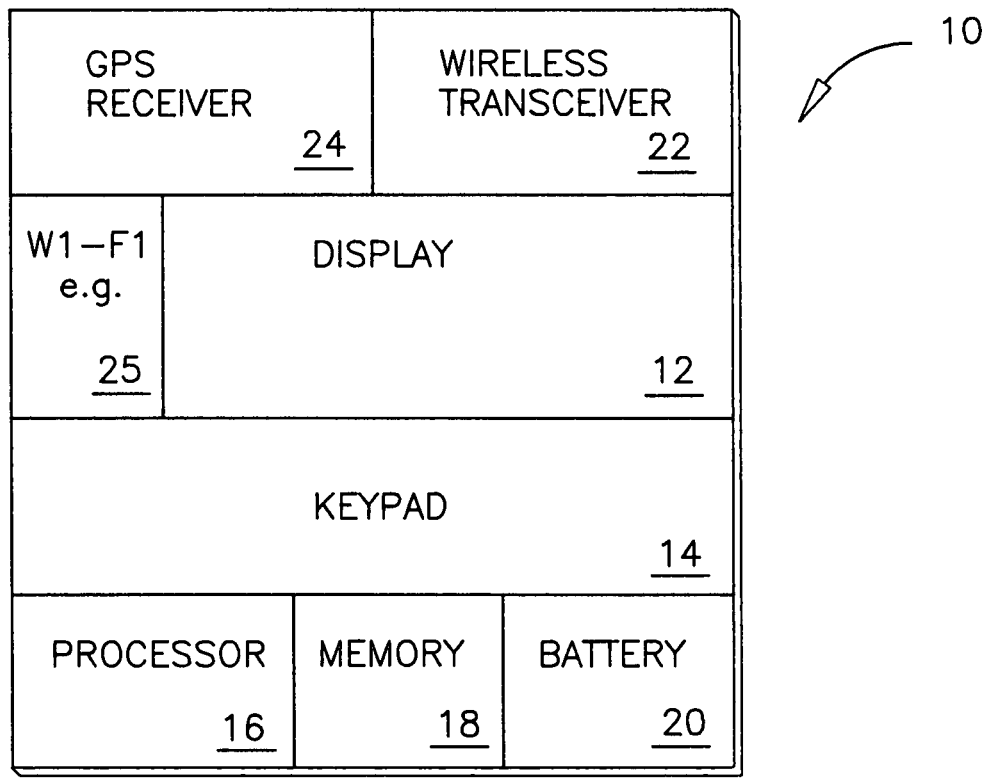
FIG. 1 is a block diagram of a non-limiting system in accordance with the present invention.
Figure 1:
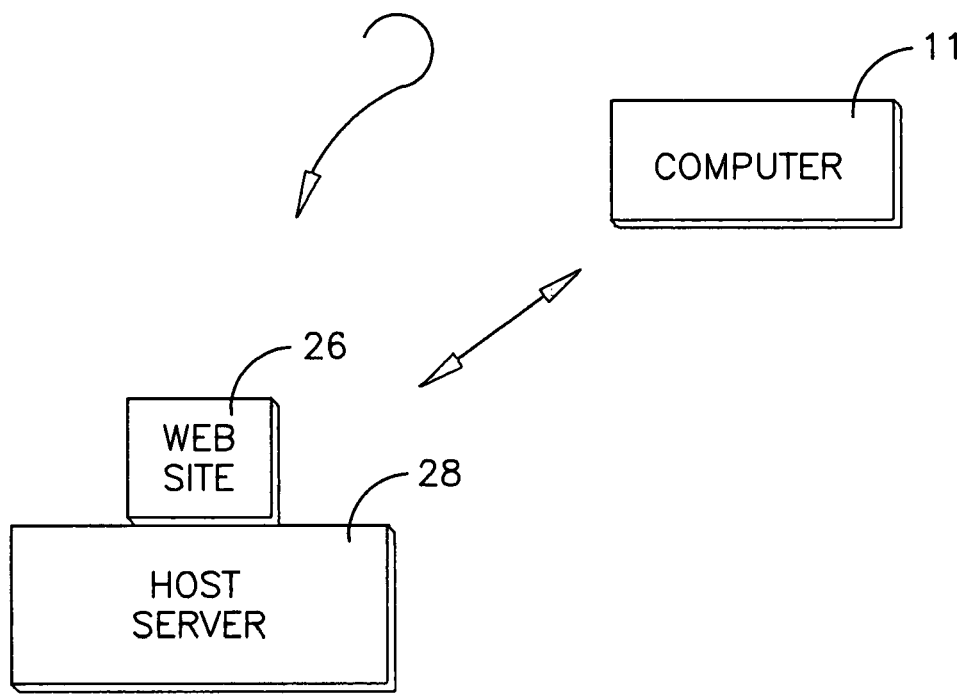

Beginning with FIG. 1, a non-limiting system diagram for a wireless telephone is shown. The wireless telephone 10 can be owned by a user who has access to an Internet-enabled computer 11 for purposes to be shortly disclosed.

As shown in FIG. 1, the telephone 10 has a display 12 which is used to display data to the user. Accompanying the display 12 is a keypad 14 which allows the user to input data such as a telephone number or text message. The data is managed by at least one processor 16. The processor 16 includes the capability to execute logic, including the logic set forth in FIG. 2 and FIG. 3. The wireless telephone 10 also has memory 18 that is used to store data and has at least one battery 20 that supplies the wireless telephone 10 with the voltage needed to operate. A wireless transceiver 22 is embodied on the wireless telephone 10. The wireless transceiver 22 transmits and receives data, such as text messages and telephone calls. The wireless transceiver 22 can be, but is not limited to, a CDMA, TDMA, or GSM transceiver.

A Global Positioning System (GPS) receiver 24 may also be embodied on the wireless telephone 10. The GPS receiver 24 receives data that identifies the current latitudinal and longitudinal coordinates of the wireless telephone 10. All of the above components are housed in a single portable hand held housing, currently designated as the wireless telephone 10. A short range Internet transceiver 25 such as a Wi-Fi transceiver may also be provided in the telephone 10 for purposes to be shortly disclosed.

A website 26 is shown separately from the wireless telephone 10. The website 26 can be constructed and maintained on a host server 28. As more fully discussed below, the website 26 informs the user of the location of the lost or stolen wireless telephone 10. The website 26 does this based on the latitudinal and longitudinal coordinates received by the GPS receiver 24, transmitted by the wireless transceiver 22 and received by the website 26.

Figure 2:
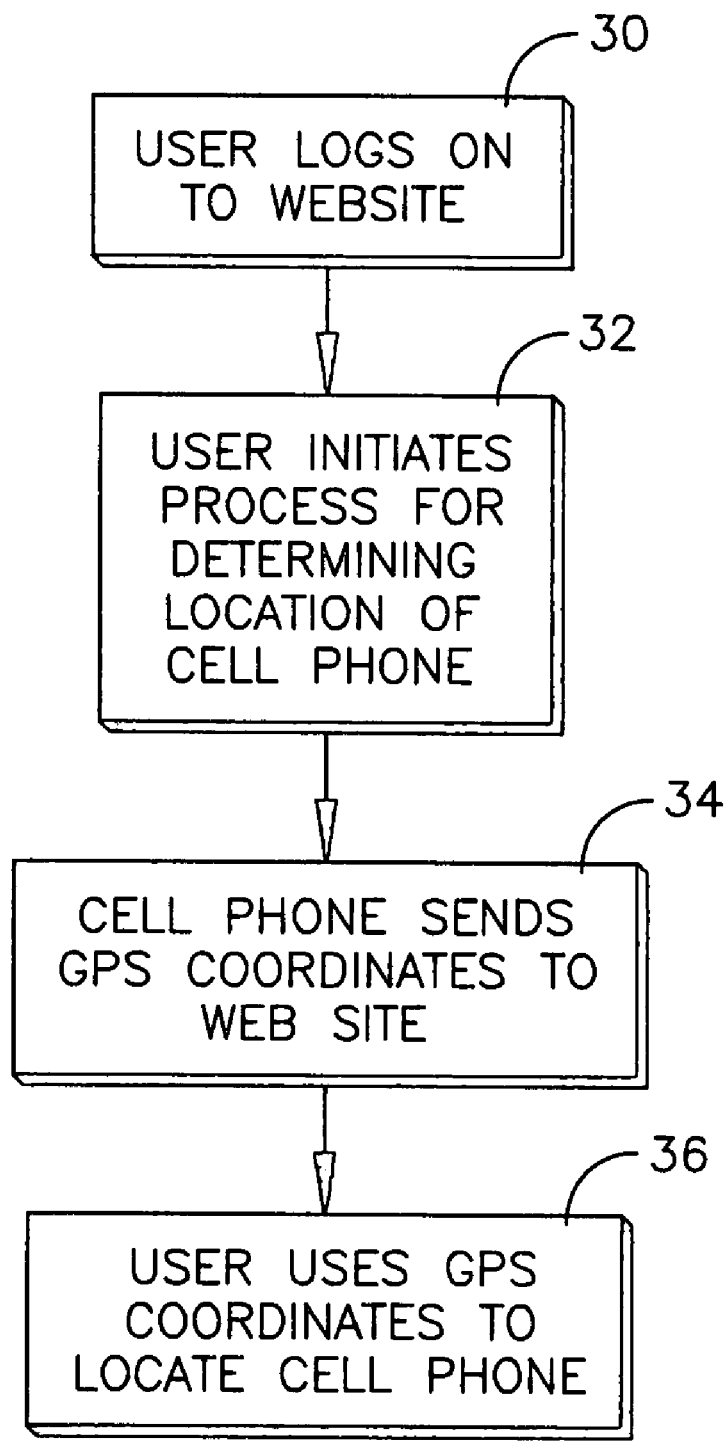
FIGS. 2 and 3 are flow charts showing non-limiting logic in accordance with present principles.

Moving to FIG. 2, the process for locating the wireless telephone 10 when misplaced or stolen is shown. Beginning the logic at block 30, a user, by means of the computer 11, logs on to the website 26. The website 26 is capable of interacting with the wireless telephone 10 through the logic discussed below.

Specifically, at block 32 the user initiates the process for determining the location of the wireless telephone 10 by accessing the website 26 and providing the telephone number and/or IP address of the phone 10, and in response the website 26 establishes communication with the wireless telephone 10. Communication may be established through the Internet transceiver 25 and a browser executed by the wireless telephone processor 16 using the IP address of the telephone, and/or communication may be established through the transceiver 26 using the telephone number of the telephone. In either case, the server prompts the telephone to relay back the location of the telephone.

Accordingly, at block 34 the GPS receiver 24 determines the current latitudinal and longitudinal coordinates of the wireless phone 10. Moving to block 36, the current latitudinal and longitudinal coordinates of the wireless telephone 10 are transmitted to the website 26 by the wireless transceiver 22 or over the short range wireless Internet link. Concluding at block 38, the user acquires the current latitudinal and longitudinal coordinates sent by the wireless telephone 10 by accessing the server, which provides the coordinates, in some implementations by showing the telephone location on a map.

Figure 3:
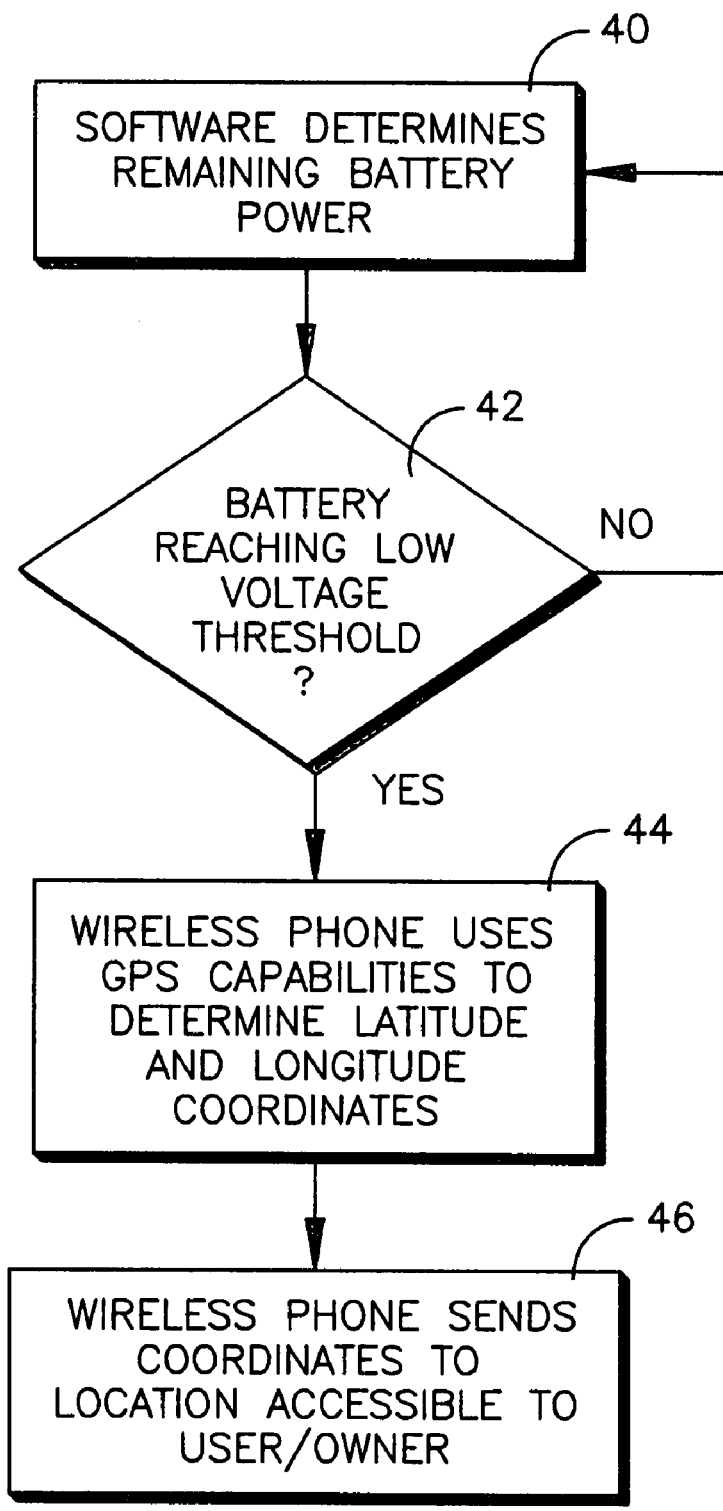

Now turning to FIG. 3, the logic for determining the last known GPS coordinates when the wireless telephone 10 reaches the low voltage threshold is shown. The low voltage threshold is predetermined so that when the threshold is reached, the logic proceeds as follows. It is to be understood that in a non-limiting implementation the low voltage threshold is established based on any appropriate criterion, e.g., the voltage below which the phone has insufficient transmission power or the voltage that is just high enough to permit the processor to execute the logic before it can no longer function.

Beginning at block 40, the logic determines the voltage remaining in the battery 20. At decision diamond 42, the logic determines whether the remaining battery voltage in the battery 20 has reached the low voltage threshold. If the battery has not reached the low voltage threshold, the logic reverts back to block 40 and the process loops. It is to be understood that the process may immediately begin again, or it may begin at predetermined time intervals.

If the battery voltage equals the low voltage threshold, at block 44 the logic determines the current latitudinal and longitudinal coordinates through GPS receiver 24. Alternatively, the logic accesses the latest GPS coordinates stored in the wireless telephone 10 memory at block 44. The logic then concludes at block 46 at which the transceiver 22 sends the most recent coordinates of the wireless telephone 10 to the predetermined website 26. At any time thereafter, the website 26 can be accessed by the user to determine the last known location of the wireless telephone 10. Alternatively, the website 26 may also automatically generate an alert such as an email, which will be sent to the user and will identify the last known location of the wireless telephone 10.

The present invention recognizes that while in the low voltage threshold, the location of the cell phone may change. In light of this, it is to be understood that the logic set forth in FIG. 3 may reoccur upon the elapse of a predetermined period of time. This is necessary to receive the cell phone's most recent location prior to completely shutting off due to low voltage. More specifically, because the wireless phone 10 may stay within the low voltage threshold for more than a momentary period of time, e.g. it may remain within the low voltage threshold for several minutes during which period the location of the phone might change, it is desirable that the logic of FIG. 3 repeat periodically while the phone 10 is within the low voltage threshold to ensure that the user will have the most accurate GPS coordinates feasible.

The telephone 10 can execute the logic of one or both of FIGS. 2 and 3.

While the particular SYSTEM AND METHOD FOR OBTAINING LOCATION OF WIRELESS TELEPHONE FROM INTERNET SERVER is herein shown and described in detail, it is to be understood that the subject matter which is encompassed by the present invention is limited only by the claims.

What is claimed is:

1. A wireless telephone, comprising:
   at least one wireless telephony transceiver;
   at least one position receiver configured for outputting at least one geographic position signal;
   at least one battery configured for powering at least the transceiver; and
   at least one processor configured for executing logic to automatically activate the telephony transceiver and an Internet transceiver to send the geographic position signal through both transceivers when a voltage of the battery satisfies at least one low voltage criterion such that the same geographic position signal is sent through two paths substantially simultaneously, one path originating the telephony transceiver and a second path originating at the Internet transceiver.

2. The telephone of claim 1, wherein the server communicates with the wireless telephone using a telephone number of the telephone.

3. The telephone of claim 1, wherein the server communicates with the wireless telephone using an IP address of the telephone.

* * * * *